United States Patent Office 3,501,513
Patented Mar. 17, 1970

3,501,513
PREPARATION OF 17-DESOXY STEROIDS FROM CORRESPONDING 17α,21-DIHYDROXY - 20 - OXO STEROIDS AND 21-ESTERS THEREOF
Imre Bacso, Palo Alto, Calif., assignor to Syntex Corporation, Panama, Panama, a corporation of Panama
No Drawing. Filed Feb. 29, 1968, Ser. No. 709,206
Int. Cl. C07c *169/34, 167/30;* A61k *17/12*
U.S. Cl. 260—397.45
6 Claims

ABSTRACT OF THE DISCLOSURE

Preparation of 17-desoxy-20-oxo - 21 - hydroxy steroids from the corresponding 17α,21-dihydroxy-20-oxo-steroids and the 21-esters thereof by sequentially treating the latter with (1) alkanolic hydrogen halide, (2) acetic acid and an aqueous hydrogen halide at elevated temperatures, and (3) zinc-copper couple in alkanlolic acetic acid.

---

The present invention is directed to a novel dehydroxylation procedure.

In particular, the present invention is directed to a process whereby 17α-desoxy-20-oxo-21-hydroxy steroids of the pregnane series are prepared from the corresponding 17α, 21-dihydroxy-20-oxo steroids or 21-esters thereof of the pregnane series.

Many 17α-desoxy-20-oxo-21-hydroxy steroids of the pregnane series are known to the art and many of these compounds are known and used as medicinal agents and/or as intermediates for the preparation of medicinal agents. For example, corticosterone is used in the treatment of adrenal insufficiency and can be prepared from hydrocortisone by the present process. 6α,9α-difluoro-11β, 21-dihydroxypregna-1,4-diene-3,20-dione, a known compound possessing glucocorticoid and anti-phlogistic activity, can be prepared from 9α-fluoro hydrocortisone by selectively removing the 17α-hydroxy group by means of the present process to obtain 9α-fluoro corticosterone; then introducing the 6α-fluoro group by conventional means known to the art, such as by preparing the corresponding 3-alkoxy-Δ$^{3,5}$ derivative thereof and treating it with perchloryl fluoride; and then selectively dehydrogenating at positions C-1,2 by conventional techniques, e.g. by heating with 2,3-dichloro-5,6-dicyano-1,4-benzoquinone in dioxane, or heating with selenium dioxide in tert-butanol, or the like.

In the steroid art, it is well known that 17α-desoxy-20-oxo-21-hydroxy steroids of the pregnane series are difficult to prepare; see, for examples, J. K. Norymberski, J. Chem. Soc. (London), 1956, 517–519, 517. On the other hand, 17α,21-dihydroxy steroids and the 21-esters thereof of the pregnane series are available and are more easily prepared than the corresponding 17α-desoxy steroids. Consequently, for a number of years steroid chemists have been attempting to discover some means of preparing 3-keto-11-oxygenated-17α-desoxy-20-oxo-21-hydroxy steroids of the pregnane series from the corresponding 17α-hydroxy steroid economically in high yields and with a minimum number of steps.

Processes have been described in the literature for the selective removal of a 17α-hydroxy group, but these processes possess the economic disadvantages of requiring many steps and/or affording low overall yields. See, for example, the processes of O. Mancrera et al., J.A.C.S. 77, 5669–5672; H. L. Herzog et al., J.A.C.S. 83, 4073–4076; D. Taub et al., J.A.C.S. 76, 4094–4097; and the J. K. Norymberski reference cited above.

The applicant's present novel process, however, does provide for the first time a means of preparing 17α-desoxy-20-oxo-21-hydroxy steroids of the pregnane series from the corresponding 17α-hydroxy steroids economically in high yield in only three steps.

The present novel process can be illustrated by the following reaction sequence:

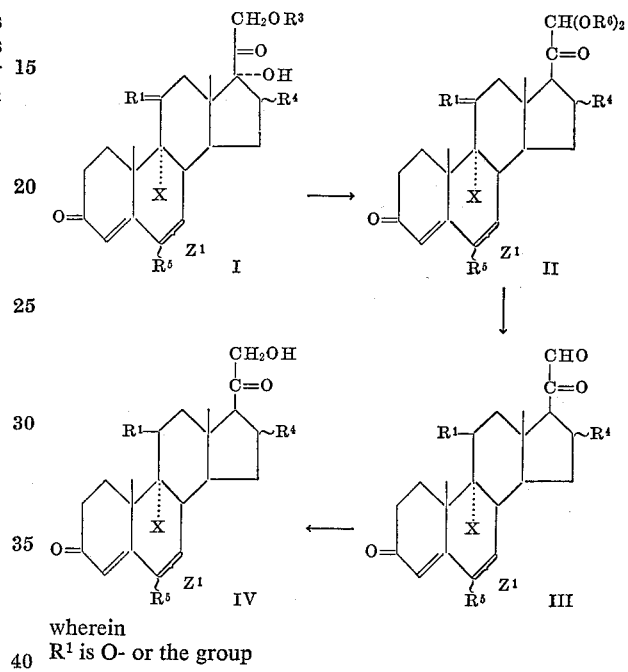

wherein
$R^1$ is O- or the group $$R^2\overset{H}{\underset{\phantom{.}}{\text{-}}}$$

$R^2$ is hydrogen or hydroxy;
$R^3$ is hydrogen or acyl;
each of $R^4$ and $R^5$ is hydrogen or alkyl;
$R^6$ is alkyl;
X is hydrogen or fluoro; and
$Z^1$ is a carbon-carbon single bond or a carbon-carbon double bond.

The serpentine line (∼) denotes that the group attached thereby is in either the alpha or beta configuration. The dotted line (. . .) denotes that the group attached thereby is in the alpha configuration.

The present novel process comprises three steps; (1) the preparation of 17-desoxy-20-oxo-21,21-bisalkoxy steroids of the pregnane series, the compounds of Formula II, from the corresponding starting 17α,21-dihydroxy-20-oxo steroids or the 21-esters thereof of the pregnane series, the compounds of Formula I: (2) the preparation of 17-desoxy-20,21-dioxo steroids of the pregnane series, the compounds of Formula III, from the corresponding compounds of Formula II; and (3) the preparation of 17- desoxy-20-oxo-21-hydroxy steroids, the compounds of Formula IV, from the corresponding steroids of Formula III.

The compounds of Formula II are prepared by treating the corresponding compounds of Formula I with a 1 N to 3 N alkanolic hydrogen halide. The reaction is conducted at a temperature within the range of 0° C. to about 60° C., and preferably at about 25° C. The reaction is heated for a period of one to 100 hours, preferably about 48 hours.

Any lower alkanol can be employed to prepare the alkanolic hydrogen halide, but methanol and ethanol are preferred.

Typical hydrogen halides includes hydrogen chloride, hydrogen bromide, and the like. The preferred hydrogen halide is hydrogen chloride.

The preferred alkanolic hydrogen halide mixture is a 2 N methanolic hydrogen chloride mixture.

The product is isolated by conventional techniques, such as by pouring the reaction mixture into water, filtering the resulting crystals, and then drying the crystals.

The compounds of Formula III are prepared by treating the corresponding compounds of Formula II with a mixture of 1:2 to 2:1 by volume acetic acid:aqueous 1 N to 3 N hydrochloric acid at a temperature in the range of 50–60° C. The preferred acetic acid:hydrochloric acid mixture is a 1:1 by volume acetic acid: aqueous 2 N hydrochloric acid mixture. The reaction mixture is heated for at least two hours. Preferably the reaction mixture is heated for a period of 2–8 hours. The product, a compound of Formula III, is isolated by conventional techniques, such as by evaporating the reaction mixture to dryness.

The 17α-desoxy compounds of Formula IV are prepared from the corresponding compounds of Formula III by treating the latter with zinc-copper couple in acetic acid, optionally and preferably in the presence of an alkanol. The process is conducted at a temperature in the range of about 0° C to the reflux temperature of the reaction mixture. When an alkanol is employed as a co-solvent with acetic acid, the acetic acid:alkanol mixture is preferably a 1:2 to 1:4 by volume acetic acid:- alkanol mixture.

The zinc-copper couple can be prepared by methods known to the art; see, for example, the method of R. D. Smith and H. E. Simmonds, Org. Syn., 41, 72 (1961). A sufficient amount of zinc-copper couple is employed so as to have at least a molar equivalent of zinc per molar equivalent of the compound of Formula III.

Any alkanol can be used, but the lower alkanols, such as methanol, ethanol, propanol or 2-propanol, are generally employed.

The product is isolated by conventional techniques, for example, the reaction mixture is filtered and evaporated. The product can be further purified by conventional means, such as chromatography, recrystallization, and the like.

The starting materials that can be utilized in the present novel process are not limited to those compounds of Formula I, but rather, 11-desoxy or -oxygenated 17α,21-dihydroxy-20-oxo starting steroids and the 21-esters thereof substituted with hydroxy groups at positions 1, 7, 12, 14, 15, 18 and/or 19, alkyl groups at positions 1, 2, 4, 6, 7, 12, 14, 15, 18 and/or 19, methylene groups at positions 1, 2, 6, 7, 12 and/or 15, methylene bridging positions 1,2; 6,7 and/or 15,16 keto groups at positions 1, 2, 4, 6, 11, 12, 15 or 16, and the like, can be utilized in the present process.

The following example is included to further illustrate the persent novel invention and is not intended to be a limitation on the present invention.

EXAMPLE

A mixture of 3.76 g. of 11α, 17α,21-trihydroxy-16α-methylpregn-4-ene-3,20-dione and 150 ml. of 2 N anhydrous hydrogen chloride in methanol is stirred for 48 hours at room temperature; the reaction mixture is then reduced to dryness to yield 3.9 g. of 11β-hydroxy-16α-methyl-21,21-bismethoxypregn-4-ene-3,20-dione.

The above product is added to a mixture of 100 ml. of glacial acetic acid and 100 ml. of aqueous 2 N hydrochloric acid. The resulting mixture is heated to 55° C.+ 5° C. for three hours; then the reaction mixture is cooled and evaporated to yield 3.1 g. of 11β-hydroxy-16α-methylpregn-4-ene-3,20,21-trione.

The above 21-oxo product is added to a mixture of 4.5 g. of zinc:copper couple [prepared as described by R. D. Smith et al., Org. Syn., 41, 72 (1961)] and 200 ml. of 25% acetic acid in methanol; the resulting mixture is stirred at 25° C. for eight hours. The reaction mixture is then filtered and evaporated to give 2.95 g. of 11β,21-dihydroxy-16α-methylpregn-4-ene-3,20-dione.

Similarly,

11β,21-dihydroxypregn-4-ene-3,20-dione;
9α-fluoro-11β,21-dihydroxypregn-4-ene-3,20-dione;
9α-fluoro - 16β - methyl - 11β,21 - dihydroxypregn - 4 - ene-3,20-dione;
6α-methyl-11β,21-dihydroxypregn-4-ene-3,20-dione;
9α - fluoro - 16α - methyl - 21 - hydroxypregn - 4 - ene-3,11,20-trione;
6-methyl - 9α - fluoro - 11β,21 - dihydroxypregna - 4,6-diene-3,20-dione;
21-hydroxypregn-4-ene-3,11,20-dione; and
21-hydroxypregn-4-ene-3,20-dione
are prepared from
11β,17α,21-trihydroxypregn-4-ene-3,20-dione;
9α-fluoro-11β,17α,21-trihydroxypregn-4-ene-3,20-dione;
9α - fluoro - 16β - methyl - 11β,17α,21 - trihydroxypregn-4-ene-3,20-dione;
6α - methyl - 11β,17α,21 - trihydroxypregn - 4 - ene - 3,20-dione;
9α - fluoro - 16α - methyl - 17α,21 - dihydroxypregn - 4-ene-3,11,20-trione;
6 - methyl - 9α - fluoro - 11β,17α,21 - trihydroxpregna-4,6-diene-3,20-dione;
17α,21-dihydroxypregn-4-ene-3,11,20-trione;
and 17α,21-dihydroxypregn-4-ene-3,20-dione
respectively by means of the above process.

What is claimed is:

1. A process for the preparation of a 17-desoxy-20-oxo-21-hydroxy steroid of the pregnane series from the corresponding starting 17α,21-dihydroxy-20-oxo steroid or 21-ester thereof of the pregnane series, which comprises treating the starting steroid with 1 N to 3 N alkanolic hydrogen halide to afford the corresponding 17-desoxy-20-oxo-21,21-bisalkoxy steroid of the pregnane series; treating the thus obtained 17-desoxy-21,21-bisalkoxy steroid with a 1:2 to 2:1 by volume acetic acid:aqueous 1 N to 3 N hydrochloric acid mixture at 50° C. to 60° C. to afford the corresponding 17-desoxy-20,21-bisoxo steroid of the pregnane series; and treating the thus obtained 21-oxo steroid with zinc-copper couple in an acetic acid-alkanol mixture to obtain the corresponding 17-desoxy-20-oxo-21-hydroxy steroid of the pregnane series.

2. The process according to claim 1 wherein the starting 17α,21-dihydroxy-20-oxo steroid or the 21-ester thereof of the pregnane series is a compound of the formula

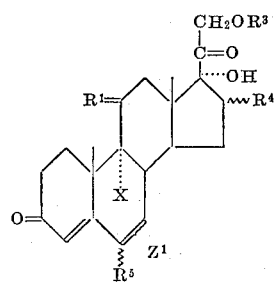

in which
R¹ is O- or the group

R² is hydrogen or hydroxy;
R³ is hydrogen or acyl;
each of R⁴ and R⁵ is hydrogen or alkyl;
X is hydrogen or fluoro; and
Z¹ is a carbon-carbon double bond or a carbon-carbon single bond;

the 17-desoxy-20-oxo-21,21-bisalkoxy steroid of the pregnane series is a compound of the formula

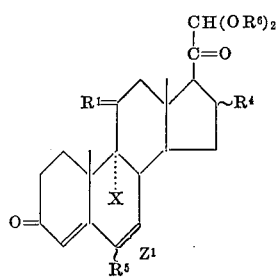

in which
R⁶ is alkyl;

the 17-desoxy-20,21-bisoxo steroid of the pregnane series is a compound of the formula

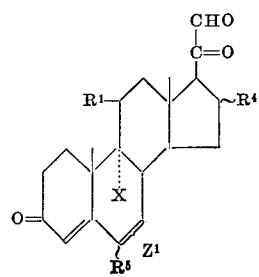

and the 17-desoxy-20-oxo-21-hydroxy steroid of the pregnane series is a compound of the formula

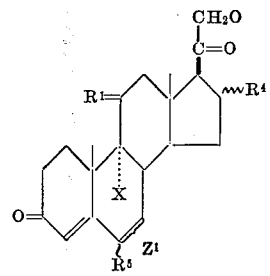

3. The process according to claim 2 wherein the starting $17\alpha,21$-dihydroxy-20-oxo steroid or 21-ester thereof of the pregnane series is treated with 2 N methanolic hydrogen chloride to afford the corresponding 17-desoxy-20-oxo-21,21-bismethoxy steroid of the pregnane series; treating the thus prepared 17-desoxy-21,21-bismethoxy steroid with a 1:1 by volume acetic acid:aqueous 2 N hydrochloric acid mixture at 50° C. to 60° C. for at least 2 hours to afford the corresponding 17-desoxy-20,21-bisoxo steroid of the pregnane series; and treating the thus prepared 21-oxo steroid with zinc-copper couple in a 1:2 to 1:4 by volume acetic acid:methanol mixture to afford the corresponding 17-desoxy-20-oxo-21-hydroxy steroid of the pregnane series.

4. The process according to claim 3 wherein the 17-desoxy-20-oxo-21-hydroxy steroid of the pregnane series is $11\beta,21$-dihydroxypregn-4-ene-3,20-dione and the starting $17\alpha,21$-dihydroxy-20-oxo steroid or 21-ester thereof of the pregnane series is $11\beta,17\alpha,21$-trihydroxypregn-4-ene-3,20-dione, or the 21-acetate thereof.

5. The process according to claim 3 wherein the 17-desoxy-20-oxo-21-hydroxy steroid of the pregnane series is $11\beta,21$-dihydroxy-$16\alpha$-methylpregn-4-ene-3,20-dione and the starting $17\alpha,21$-dihydroxy-20-oxo steroid or 21-ester thereof of the pregnane series is $11\beta,17\alpha,21$-trihydroxy-$16\alpha$-methylpregn-4-ene-3,20-dione, or the 21-acetate thereof.

6. The process according to claim 3 wherein the 17-desoxy-20-oxo-21-hydroxy steroid of the pregnane series is $9\alpha$-fluoro-$11\beta,21$-dihydroxypregn-4-ene-3,20-dione and the starting $17\alpha,21$-dihydroxy-20-oxo steroid or 21-ester thereof of the pregnane series is $9\alpha$,fluoro-$11\beta,17\alpha,21$-trihydroxypregn-4-ene-3,20-dione, or the 21-acetate thereof.

No references cited.

HENRY A. FRENCH, Primary Examiner

U.S. Cl. X.R.

260—397.47